June 9, 1925.  1,541,485
E. DENNIS
ELECTRIC SWITCH BOX
Filed March 8, 1922
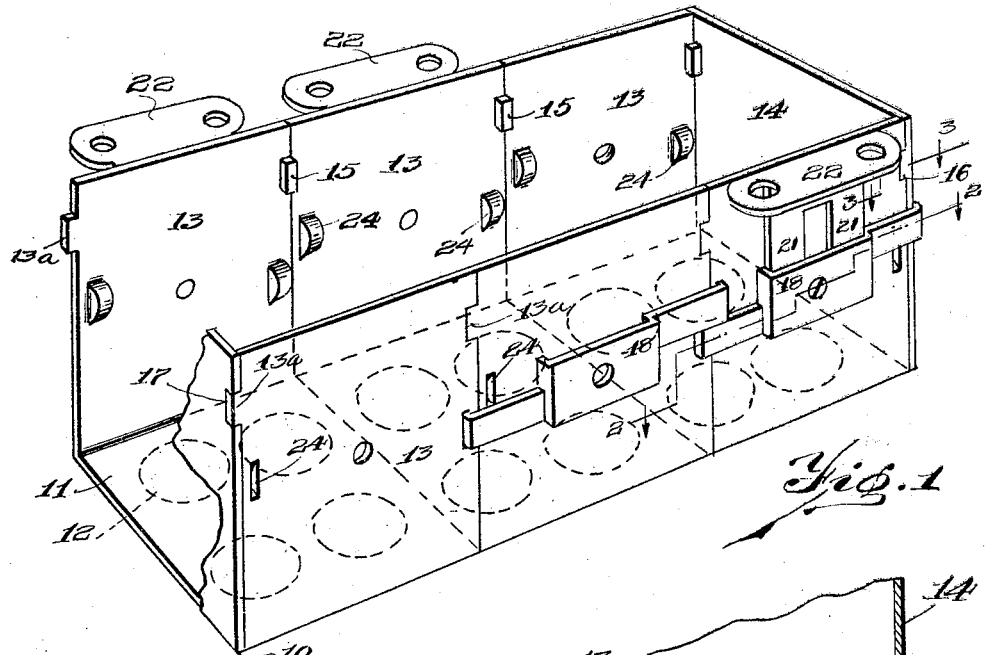
Fig. 1
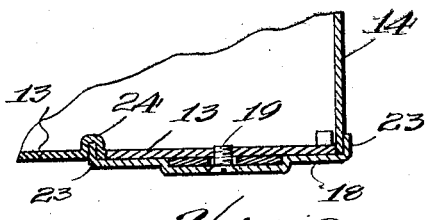
Fig. 2
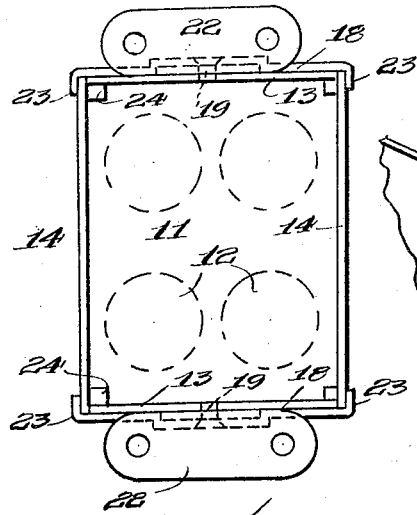
Fig. 5
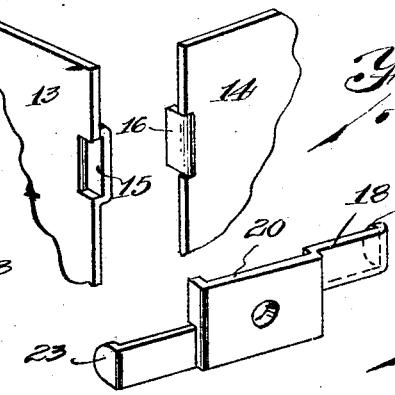
Fig. 3
Fig. 4
Inventor
Earl Dennis
By Ralzemond A. Parker
Attorney Patented June 9, 1925.

1,541,485

UNITED STATES PATENT OFFICE.

EARL DENNIS, OF DETROIT, MICHIGAN.

ELECTRIC SWITCH BOX.

Application filed March 8, 1922. Serial No. 541,936.

*To all whom it may concern:*

Be it known that I, EARL DENNIS, citizen of the United States, residing at Detroit, county of Wayne, State of Michigan, have invented a certain new and useful Improvement in Electric Switch Boxes, and declare the following to be a full, clear, and exact description of the same, such as will enable others skilled in the art to which it pertains to make and use the same, reference being had to the accompanying drawings, which form a part of this specification.

My invention relates to improvements in switch box construction.

The object is to provide a switch box of cheap and simple construction adapted to be used as a single box, or a plurality of which boxes may be easily ganged together and used as a unitary structure. In this connection, I have provided a simple, effective clamping device adapted to retain the separate parts of the box together as a unitary single box and also adapted to secure together adjacent box sections to form a multiple box.

The above, and other objects, together with details of construction, are more fully described in the following specification, appended claims and accompanying drawings, in which:

Fig. 1 is a perspective of my improved switch box showing several sections ganged together.

Fig. 2 is a fragmentary cross-section taken on the line 2—2, Fig. 1.

Fig. 3 is a fragmentary perspective taken on substantially line 3—3 of Fig. 1.

Fig. 4 is a perspective of one of the clamping members.

Fig. 5 is an elevation of a single box.

My switch box comprises in combination a body section indicated in its entirety as 10, which is formed from a single sheet of metal and consists of a back portion 11, provided with the usual punch-outs 12, and side portions 13, which side portions may also be provided with punch-outs, if desired, and detachable end sections 14. These side portions 13 are provided on one edge with lugs 13ᵃ and opposite each of said lugs on the other edge of the side portion is an indentation 15 of a size to receive the corresponding lugs of an adjacent body section, or the turned-over lugs 16 of an end section 14.

It is evident that one end section of each box is provided with turned-over lugs 16 adapted to be received within the indentations 15 formed in the side portions of the box, and that the other end section of each box is provided with cut-outs 17 adapted to receive the lugs 13ᵃ formed on the side portions of the box opposite the depressions 15. When several of these body sections 10 are ganged together, as shown in Fig. 1, the lugs 13ᵃ of one body section interlock in corresponding indentations 15 formed in the adjacent body sections.

I provide clamping member 18, one for each side of a body section, which clamping member is adapted to be secured to said side by means of a screw 19. This clamping member is shaped at its intermediate section adjacent the screw 19, as shown at 20 to embrace the parallel forks 21 of a securing ear 22, by means of which ear the box is secured to the wall or ceiling, wherever it is desired for use. The adjustment of this securing ear is provided for by loosening the screw 19 which secures the clamping member 18 to the side of the box. When the ear is adjusted as desired, the screw is tightened and the ear is held in such adjusted position.

This clamping member extends transversely across the side of the box beyond the edges thereof and the end portions are offset as shown to permit successive clamping members carried by adjacent body sections to overlap without superimposing each other.

These clamps extend beyond the edges of the side of body sections and are turned over at the ends as shown at 23, a sufficient distance beyond the edge of such side of the body section as to engage over an end section 14, as shown in Fig. 3. The distance, therefore, beyond the edge of the side of the box at which the end of the clamping member is turned over is a distance slightly greater than the thickness of the metal forming an end section.

When the box is used as a single unit, as shown in Fig. 5, the turned over ends of the clamp engage over the detachable end sections 14 to hold them in their interlocked engagement with the sides. When several body sections are ganged together, as shown in Fig. 1, one end of the clamping member carried by any side of a body section engages in an indentation 24 in the side of an adjacent body section. These indentations 24 are staggered on each side of a body section a distance equal substantially to the width of the clamping member, to permit overlapping of successive clamps so as to interlock the several body sections of the box together.

What I claim is:

1. In a switch box, a body section having a back and two sides, two end sections, a clamping member for each side of the body section adapted to extend transversely thereover and project beyond the edges at each end, each clamping member having its end portions offset substantially the width thereof to lie alongside the clamping member of an adjacent body section, the end portions of said clamping members provided with ears to engage an adjacent body section or an end section.

2. In a switch box, in combination, a substantially U-shape body portion having two sides and a back, two independent end sections, a clamp for each side of the body portion adapted to extend transversely thereover and having end portions turned over to engage the end sections and offset from one another substantially the width thereof and connected by a bridge, means for securing said clamp to the side of the body portion, and a fastening ear held adjustably in position between the bridge of the clamp to the side of the body portion.

3. In a switch box comprising in combination, a body section consisting of two sides and a back and two end sections, a clamping member for each side of the body section having opposed offset end extensions which project beyond the edges of the side of the body section and are turned inwardly at the ends, said clamp provided with a bridge intermediate the offset end extensions, securing means extending through said bridge to fasten the clamp at the side of the body, a slotted ear adjustably receivable underneath said bridge to be held in position between the bridge and the side wall of the body.

4. In a switch box, in combination, a body section having a back and two sides, each side provided with two offset exterior indentations, separate end sections, a clamping member for each side adapted to extend transversely thereover and project beyond the side wall at each end, the ends of said clamping member offset and turned over to engage in the indentations of separate adjacent body sections to form a multiple section switch box.

5. In a switch box, in combination, a body section having a back and two sides, each side having staggered indentations, two end sections, separate body sections adapted to be disposed in abutting alinement to form a multiple unit box, a clamping member for each side of the body section, means detachably securing the same thereto, said clamping member having offset end portions which project beyond each edge of the side and are turned over at the ends to engage in the staggered indentations on the sides of adjacent body sections.

6. In a switch box, the combination of a body section having a back and two sides and two detachable end sections, separate body sections adapted to be disposed in alinement to form a multiple unit box, a clamp detachably secured to each side of each body section and having offset end portions extending beyond the side and overlapping the side of the adjacent body sections and extending along the end extension of the clamp carried by such side, the end extensions of said clamps turned inwardly into depressions in the sides of the body sections to fasten separate body sections together.

In testimony whereof, I sign this specification.

EARL DENNIS.